US008601108B1

United States Patent
Zhang et al.

(10) Patent No.: US 8,601,108 B1
(45) Date of Patent: Dec. 3, 2013

(54) CREDENTIAL AUTHENTICATION AND AUTHORIZATION IN A SERVER DEVICE

(75) Inventors: Tianming Zhang, Hopkinton, MA (US); Gregory W. Lazar, Upton, MA (US); Anthony Arous, Worcester, MA (US); Purushottam B. Sane, North Chelmsford, MA (US); Weijing Song, Acton, MA (US); James Huang, Framingham, MA (US); Keith V. Boland, Lexington, SC (US); Seth B. Horan, Wrentham, MA (US)

(73) Assignee: EMC Corporation, Hopkinton, MA (US)

( * ) Notice: Subject to any disclaimer, the term of this patent is extended or adjusted under 35 U.S.C. 154(b) by 114 days.

(21) Appl. No.: 13/172,157

(22) Filed: Jun. 29, 2011

(51) Int. Cl.
*G06F 15/173* (2006.01)
(52) U.S. Cl.
USPC ............... 709/223; 709/224; 709/226; 718/1; 718/104
(58) Field of Classification Search
USPC ...................... 709/223–224, 226; 718/1, 104
See application file for complete search history.

(56) References Cited

U.S. PATENT DOCUMENTS

| 2004/0249926 | A1* | 12/2004 | Cheng et al. | 709/223 |
| 2007/0073877 | A1* | 3/2007 | Boykin et al. | 709/225 |
| 2010/0050190 | A1* | 2/2010 | Hiltgen et al. | 719/328 |
| 2012/0110588 | A1* | 5/2012 | Bieswanger et al. | 718/104 |

* cited by examiner

*Primary Examiner* — Wing F Chan
*Assistant Examiner* — Hitesh Patel
(74) *Attorney, Agent, or Firm* — BainwoodHuang

(57) ABSTRACT

A server device is configured to perform a method for providing object class information to a management device. The method includes mapping user names included as part of entries of a database associated with the server device to a corresponding Common Information Model (CIM) object manager operating system (OS) role. The method includes receiving a management request associated with the management device, the management request having management request credential information. The method includes authenticating the management request to an operating system associated with the server device based upon the management request credential information. The method includes following authentication, authorizing the management device to a corresponding CIM object manager OS role using the management request credential information. The method includes executing a CIM object call associated with the management request using the associated CIM object manager OS role to access object class information in response to the management request.

18 Claims, 3 Drawing Sheets

CREDENTIAL AUTHENTICATION AND AUTHORIZATION IN A SERVER DEVICE

BACKGROUND

A typical data storage system or array stores data for one or more external client devices. Conventional data storage systems typically include a storage processor and an array of disk drives electrically attached to the storage processor. The storage processor includes one or more ports, such as fibre channel ports, that allow the client devices to connect to the storage processor and is typically configured to perform load and store operations on the array of disk drives on behalf of the client devices.

Conventional data storage arrays are managed remotely by a conventional management application running on a computerized management device across a network. For example, in the case where the data storage array is configured as a CLARiiON or Celerra system, produced by EMC Corporation of Hopkinton, Mass., the management device is configured as a Unisphere device, as produced by EMC Corporation of Hopkinton, Mass.

In certain configurations, one or more hypervisor servers are disposed in electrical communication over a network with the data storage array. A hypervisor server, such as Windows Hyper-V hypervisor-based server, is configured as single hardware device having an operating system that allows the concurrent, parallel operation of distinct virtual machines (VMs). The hypervisor server can also be optionally configured with third-party software, such as a CIM object manager, that acts as a liaison between the storage array and the hypervisor server. The CIM object manager is configured to retrieve object class information (e.g., disk usage or LUN usage information) related to the hypervisor server in response to requests transmitted from the data storage array.

SUMMARY

As indicated above, a typical hypervisor server is configured with both an operating system that allows the concurrent, parallel operation of distinct VMs, as well as the optional CIM object manager. However, both the CIM object manager and the operating system require separate sets of login credentials from the storage array in order to both authenticate and authorize the management requests from the storage array. For example, the CIM object manager includes security roles as part of its security model. Accordingly, the CIM object manager requires that the storage array maintains a CIM object manager-specific credential database having credentials that allow the storage array to be authorized with respect to one or more of the security roles. Additionally, the operating system associated with the hypervisor server also requires operating system login credentials, such as Windows Login credentials, from the storage array as well.

Accordingly, in order to be authenticated by both the operating system and the CIM object manager of the hypervisor server, the storage array must be configured with two sets of credentials and provide these two sets of credentials to the hypervisor server, one for the native operating system and one for CIM object manager. For example, a user of the management device typically first configures two sets of credentials to the storage array. The storage array then passes the login credentials to the CIM object manager, as executed by the hypervisor server's native operating system, to become authenticated and authorized relative to the CIM object manager. In order to retrieve host information, the CIM object manager, in turn, needs to log in the operating system with another set of host specific credentials with enough priviledge to perform the operations. With such an arrangement, however, the management of two sets of credentials to each hypervisor server can be cumbersome and time consuming to a management device operator.

By contrast to the above-described approach, embodiments of the present invention relate to credential authentication and authorization in a server device, such as hypervisor device. The server device is configured to simplify the security model for the CIM object manager running on the server device, such as a Windows Hyper-V server, by enabling the CIM object manager to utilize the native operating system authentication protocol to authorize a request from the storage array. For example, the server device is configured to receive a single set of credential information, such as a user name and password from the storage array that is configured by a user of a management device. The server device utilizes the credential information to authenticate the management request to the operating system of the server device and to authorize the management request to a CIM object manager operating system role associated with the server device. With such an arrangement, by utilizing a single set of credential information to authenticate and authorize the management request, the operators of the management device can minimize the effort typically required to manage multiple sets of login credentials for each server device.

One embodiment of the invention relates to, in a server device, a method for providing host object class information to a management device via the storage array. The method includes mapping user names included as part of entries of a database associated with the server device to a corresponding Common Information Model (CIM) object manager operating system (OS) role. The method includes receiving a management request associated with a storage array, the management request having management request credential information. The method includes authenticating the management request to an operating system associated with the server device based upon the management request credential information. The method includes following authentication, authorizing the management request to a corresponding CIM object manager OS role using the management request credential information. The method includes executing a CIM object call associated with the management request using the associated CIM object manager OS role to access object class information in response to the management request.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to credential authentication and authorization in a CIM object manager running on a server device, such as hypervisor device. The CIM object manager is configured to simplify the security model on the server device, such as a Windows Hyper-V server, by utilizing the native operating system authentication protocol to authorize a management request. For example, the CIM object manager is configured to receive a single set of credential information, such as a user name and password from a storage array configured by a user of a management device. The server device utilizes the credential information to authenticate the management request to the operating system of the server device and to authorize the management request to a CIM object manager operating system role associated with the server device. With such an arrangement, by utilizing a single set of credential information to authenticate and authorize the management request, the operators of a management device can minimize the efforts typically required to manage multiple sets of login credentials for secured communications between a storage array and the server device.

Figure 1:
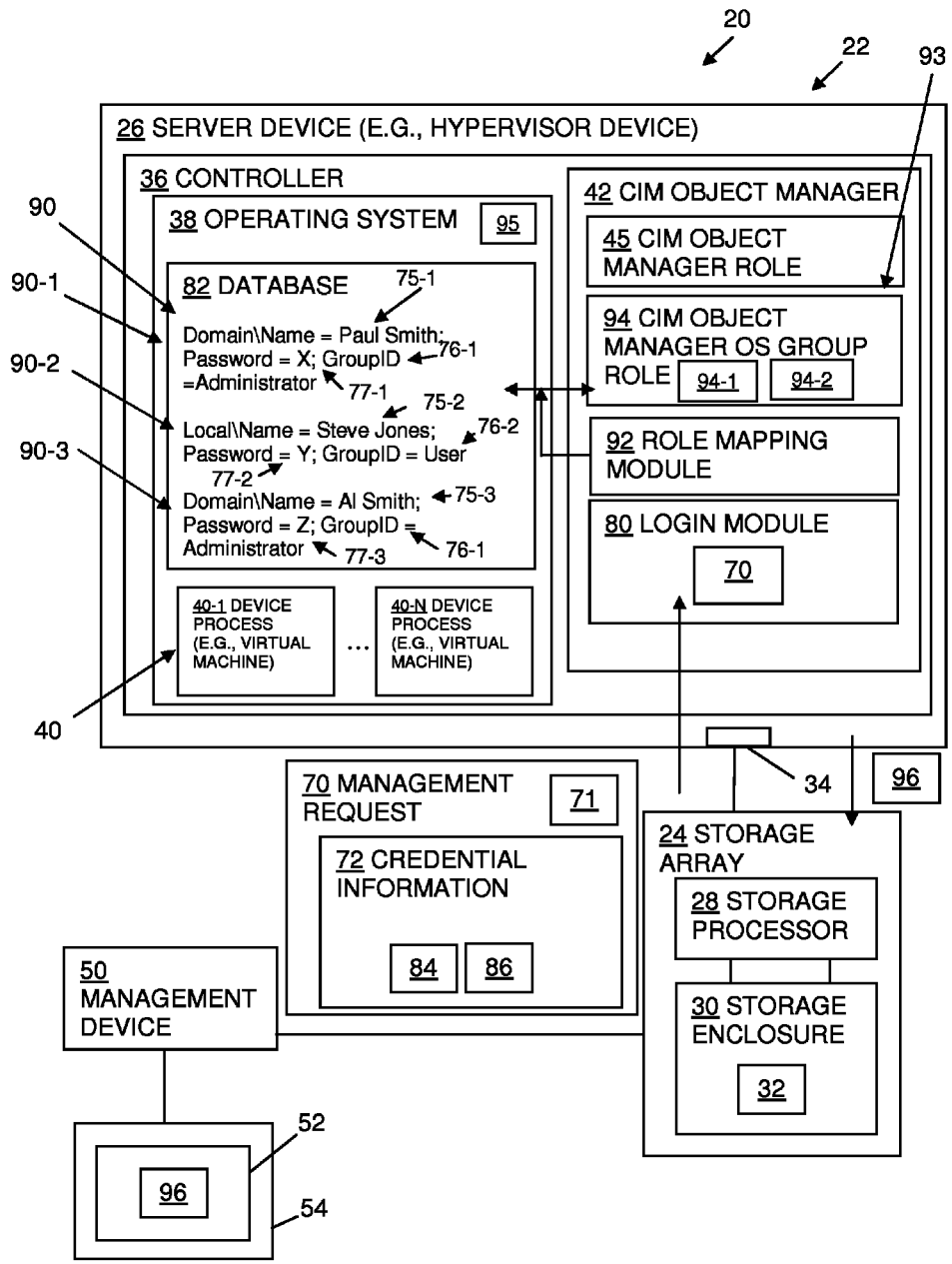
FIG. 1 illustrates a schematic representation of a data storage system disposed in electrical communication with a server device, according to one embodiment.

FIG. 1 illustrates an example arrangement of a data storage environment 20, such as used by an enterprise. As shown, the data storage environment 20 includes a data storage system 22 having a storage array 24 and a server device 26 disposed in electrical communication with the storage array 24.

The storage array 24 includes a storage processor 28 and a set of storage enclosures 30 where each storage enclosure of the set of storage enclosures 30 includes a set of storage devices 32, such as an array of tape drives or disk drives. The storage processor 28 is configured to perform load and store operations on the storage devices 32 on behalf of a host device (not shown). While the set of storage devices 32 can be identified in a variety of ways, in one arrangement, any number of the storage devices 32, a portion of a particular storage devices 32, or one or more virtual hard disk partitions associated with the storage devices 32, is identified within the data storage system 22 by a logical unit number (LUN).

In one arrangement, the storage processor 28 is configured to store a set of objects or object classes related to the storage array 24. Any object or object class may be categorized into a Common Information Model (CIM) object class to represent elements of the data storage system, such as disks, logical unit number (LUNs), RAID groups, and subsystems, for example.

A management device 50, such as a computerized device having a processor and memory, is disposed in electrical communication with the storage array 24, such as by a network connection, and is configured to remotely manage various aspects of the storage array 24. While the management device can be configured in a variety of ways, in the case where the storage array 24 is configured as a CLARiiON or Celerra system, produced by EMC Corporation of Hopkinton, Mass., the management device 50 is configured as a Unisphere device, as produced by EMC Corporation of Hopkinton, Mass. In order for the management device 50 to obtain information regarding certain aspects of the storage array 24, the management device 50 is configured to issue one or more management requests 70 for certain CIM object classes maintained by the storage array 24. In response to receiving requested CIM object classes, the management device 50 is configured to visually output the objects as part of a graphical user interface (GUI) 52 presented on an associated display 54.

The server device 26 can be configured as a hypervisor device such as Windows Hyper-V hypervisor-based server or a LINUX hypervisor-based server, is disposed in electrical communication with the storage array 24 via a communications interface 34. For example, the server device 26 can exchange communications with the storage array 24 via a network, such as a storage area network (SAN) and an IP network.

The server device 26 is configured as a single computerized device having a controller 36, such as a processor and memory, which executes an operating system 38, such as a Windows Hyper-V operating system. The operating system 38 is further configured to allow the concurrent, parallel operation of a set of device processes 40-1 through 40-N, such as virtual machines (VMs). When configured as VMs, each device process 40 is configured in software to operate as a distinct computerized device that can utilize resources associated with the storage array 24. For example, each device process 40 can utilize one or more LUNs associated with the storage array 24.

In one arrangement, the operating system 38 is configured with an associated security mechanism to restrict or allow particular administrators or storage array 24 access to the operating system 38. Accordingly, as will be discussed in detail below, the server device 26 is configured to authenticate (i.e., confirm the identity of) the storage array 24 relative to the operating system 38.

The operating system 38 is also configured with a database 82 that includes a set of entries 90 where each entry 90 includes a user name 75, password 77 and group identifier 76, such as an associated operating system group identifier (e.g., Administrators, Users, Guests, etc.). For example, as illustrated, the database 82 includes a first entry 90-1 having a user name=Paul Smith 75-1, a password=X 77-1, and a group identifier=Administrators. The database 82 includes a second entry 90-2 having a user name=Steve Jones 75-2, a password=Y 77-2, and a group identifier=Users 76-2. The database 82 includes a third entry 90-3 having a user name=Al Smith 75-3, a password=Z 77-3, and a group identifier=Administrators 76-1. As illustrated, the user associated with each entry 90 in the database 82 can be configured as a Windows Active Directory (AD) domain user, shown in entries 90-1 and 90-3, or as a Windows local user, shown in entry 90-2. It should be understood that the database 82 is merely a representation of a database utilized by the hypervisor device 26. For example, it should be noted that the database of users configured as Windows Active Directory (AD) domain users would be disposed on an Active Directory Domain Controller (not shown) distinct from the controller 36. Additionally, it should also be noted that the illustration of the passwords 77 in cleartext form is for example only. In operation, the database 82 can store the passwords 77 in a non-cleartext format.

Prior to operation of the data storage system 22, the database 82 is set-up and configured by an external third party, such as an organization's Information Technology (IT) department. Accordingly, the IT department can add or remove the local users/groups or the domain users/groups as entries 90 relative to the database 82 in order to indicate to the server device 26 the users that the server device 26 will need to manage.

The server device 26 also includes a CIM object manager 42 configured to operate as a liaison between the storage array 24 and the server device 26. The CIM object manager 42 includes a set of CIM object manager roles 45 that relate to the rights that an administrator or management device 50 has with respect to particular CIM method calls of the server device 26. For example, the set of CIM object manager roles 45 can include an Accesscontrol role, an Audit role, a Compliance role, a Configuration role, a Monitor or polling role, and a Replication role. Taking the Monitoring or polling role as an example, the polling role allows the CIM object manager 42 to execute polling CIM method calls on behalf of the storage array 24. In such an arrangement, the polling role of the CIM object manager 42 is configured to poll or retrieve CIM object class information, such as disk usage or LUN usage information related to the server device 26 and/or associated device process 40, from the server device 26 in response to a management requests transmitted from the storage array 24. While the controller 36 can be configured with optional software in a variety of ways, in one arrangement, the CIM object manager 42 is configured as an add-on process or component to the server device 26 which originates from a third party.

In one arrangement, the CIM object manager 42 is also configured with a security mechanism to restrict or allow particular administrators or management devices 50 to execute particular CIM method calls. For example, the CIM object manager 42 includes as part of the security mechanism one or more CIM object manager operating system (OS) roles 93 (e.g., CIM object manager OS security roles), a role mapping module 92 and a login module 80.

In one arrangement, the CIM object manager OS role 93 is configured as a CIM object manager OS group role 94 operable to execute any CIM object calls associated for a user associated with a particular group. For example, a CIM object manager OS Administrator role 94-1 is configured to execute any CIM object calls associated with the Administrators group while a CIM object manager OS Manager role 94-2 is configured to execute any CIM object calls associated with the Users group. Each CIM object manager OS group role 94 has an associated set of privileges (i.e., execution rights of CIM methods). For example, the CIM object manager OS Administrator role 94-1 has access to all data and functionality available through the CIM object manager 42 while the CIM object manager OS User role 94-2 has access to all data available through the CIM object manager 42 but cannot change them through the CIM object manager 42.

The role mapping module 92 is configured to map user names 75 of a group 76, as identified in the database entries 90, to a corresponding CIM object manager OS group role 94. For example, the role mapping module 92 maps all of the users 75 in the database 82 having a group identifier 76 of "Administrators" to the corresponding CIM object manager OS Administrator role 94-1. In another example, the role mapping module 92 maps all of the users 75 in the database 82 having a group identifier 76 of "Users" to the corresponding CIM object manager OS User role 94-2. Such mapping enables or authorizes subsequent CIM calls associated with a particular group 76 to succeed. It should be noted that the description of mapping based upon group identifier is by way of example only. In one arrangement, one can also map a user (local or domain user) to the role.

The login module 80 functions as proxy to a login service 95 associated with the operating system 38. For example, the login module 80 is configured to receive a management request 70 from the storage array 24 and provide credential information 72 to the login service 95. In one arrangement, the credential information 72 is pre-configured by a user of the management device 50 and stored on the storage array 24. The login service, in turn, is configured to perform an authentication procedure on the credential information 72 received as part of a management request 70, as will be described in detail below.

Figure 2:
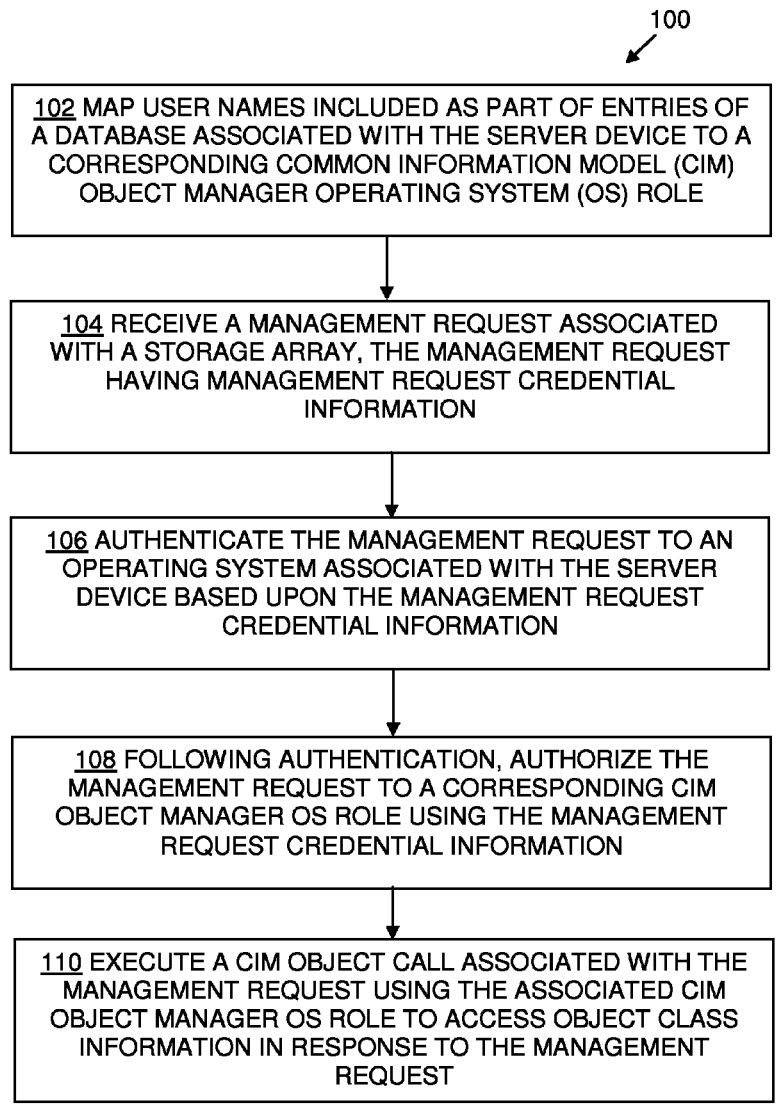
FIG. 2 is a flowchart that illustrates a procedure performed by the server device of FIG. 1, according to one embodiment.

FIG. 2 is a flowchart 100 that illustrates a procedure performed by the server device 26 of FIG. 1 for providing object class information to the management device 50.

In step 102, the CIM object manager 42 on the server device 26 maps user names 75 included as part of entries 90 of a database 82 associated with the server device 26 to a corresponding Common Information Model (CIM) object manager OS role 93. For example and with reference to FIG. 1, prior to operation, a customer installs the CIM object manager 42 onto the server device 26. Additionally, an operator of the management device 50 configures the IP, port, and credential information for each attached server device 26 on the storage array 24. The storage array 24 subsequently can then use this information to communicate with the CIM object manager 42 previously installed on the server device 26. At boot time of the CIM object manager 42, the role mapping module 92 statically maps users 75 of each group 70 from the database 82 to a specific, corresponding CIM object manager OS group role 94. For example, the role mapping module 92 maps all of the users of the "Administrators" group 76-1, in this case users Paul Smith and Al Smith, to the CIM object manager OS Administrator role 94-1. The role mapping module 92 further maps all of the users of the "Users" group 76-2, in this case user Steve Jones, to the CIM object manager OS Users role 94-2.

In step 104, the CIM object manager 42 on the server device 26 receives a management request 70 associated with the storage array 24, the management request 70 having management request credential information 72. For example, with reference to FIG. 1, assume the case where user would like to ascertain the status of the storage utilized by the server device 26. In such a case and as part of a login procedure, the user causes the management device 50 to trigger the storage array 24 to transmit a management request 70 to the CIM object manager 42 where the management request 70 includes a CIM related method call 71, such as pollServer call, to request the status of the storage utilized by the server device 26. The management request 70 also includes management request credential information 72 used to identify the management device 50 to the server device 26. For example, the credential information 72 can include identification information, such as a user name 84 and a password 86 associated with a user of the operating system 38, an Internet Protocol (IP) address associated with the server device 26, and/or a port number associated with the CIM object manager 42.

As a result of the storage array 24 transmitting the management request 70, the CIM object manager 42 forwards the management request 70 to the login module 80 which functions as proxy to the login service 95 of the operating system 38. As indicated above, and as described below, the login service 95 is configured to authenticate incoming credential information 72 relative to the database 82.

Returning to FIG. 2, in step 106, the server device 26 authenticates the management request 70 to an operating system 38 associated with the server device 26 based upon the management request credential information. In one arrangement and with reference to FIG. 1, the operating system login service 95 of the server device 26 performs the authentication procedure to verify the identity of the management request 70. During the authentication procedure, the login service 95 compares the user name 84 and the password 86 from the management request 70 with the user name 75 and password 77 of each entry 90 of the database 82. During the comparison procedure, in the case where the login service 95 does not detect a match between the user name 84 and password 86 and the user name 75 and password 77 of each entry 90 in the database 82, the server device 26 does not identify the user of the management request 70 as being authorized to access the operating system 38 refrains from authenticating the user of the management request 70. Accordingly, the server device 26 limits or prevents the user of the management request 70 from interacting with the operating system 38 associated with server device 26. However, in the case where the login service 95 detects the user name 84 and password 86 as corresponding to, or matching, the user name 75 and password 77 of an entry 90 in the database 82, the server device 26 authenticates the user of the management request 70 to the operating system 38. Accordingly, the server device 26 allows the user of management request 70 to interact with (i.e., log into) the operating system 38 associated with the server device 26.

Returning to FIG. 2, in step 108, following authentication, the server device 26 authorizes the management request 70 to a corresponding CIM object manager OS role 93 using the management request credential information 72. Based upon a successful authentication where the name 84 and password 86 of the credential information 72 matches a database entry 90, the login service 95 returns the group identifier 76 associated with the user name to the CIM object manager 42. For example, assume the case where the login service 95 authenticates user Paul Smith 75-1 to the operating system 38. In such a case, the login service 95 provides the corresponding group identifier "Administrators" 76-1 to the CIM object manager 42. The CIM object manager 42, in turn, reviews the group identifier 76-1 to detect a corresponding CIM object manager OS group role 94. For example, because the group identifier 76-1 identifies the user as being associated with the Administrators group, the CIM object manager 42 authorizes the user Paul Smith to execute the corresponding CIM methods or to retrieve the corresponding CIM objects associated with the CIM object manager OS Administrator role 94-1.

Returning to FIG. 2, in step 110, the server device 26 executes a CIM object call 71 associated with the management request 70 using the associated CIM object manager OS role 93 to access object class information in response to the management request 70. For example, with reference to FIG. 1, assume the case where the management request 70 includes the CIM related method call 71, such as pollServer call, to request the status of the storage utilized by the server device 26, including the storage utilized by each device process (e.g., VM) 40. Further assume that the corresponding CIM object manager OS Administrator role 94-1 is configured to execute CIM object monitoring or polling calls on the server device 26 on behalf of the storage array 24. Accordingly, the server device 26 causes the CIM object manager OS Administrator role 94-1 to execute method calls to obtain object class information, such as LUN information, related to the storage attributes of the server device 26 and associated device processes 40. Once collected, the server device 26 provides the object class information 96 to the storage array 24. The storage array 24 relates the LUN usage information from the server device 26 with the corresponding storage attributes from the storage array 24, and returns the information to the management device 50. The management device 50, in turn, outputs the collected object class information 96 as part of the GUI 52 on the display 52.

With the present configuration of the server device 26, the storage array 24 provides a single set of credential information 72, such as a user name 84, password 86 to become authenticated to the operating system 38 of the server device 26 and to be authorized to the CIM object manager 42 associated with the server device 26. With such an arrangement, the transmission of a single set of credential information 72 to the server device 26 can minimize the complexity typically required to manage and provide multiple sets of login credentials to conventional server devices.

While various embodiments of the invention have been particularly shown and described, it will be understood by those skilled in the art that various changes in form and details may be made therein without departing from the spirit and scope of the invention as defined by the appended claims.

For example, FIG. 1 illustrates a single server device 26, such as configured as a hypervisor device, disposed in electrical communication with the storage array 24. Such illustration is by way of example only. In one arrangement, the data storage system 22 can include two or more server devices, such as hypervisor servers, disposed in electrical communication with the storage array 24.

Figure 3:
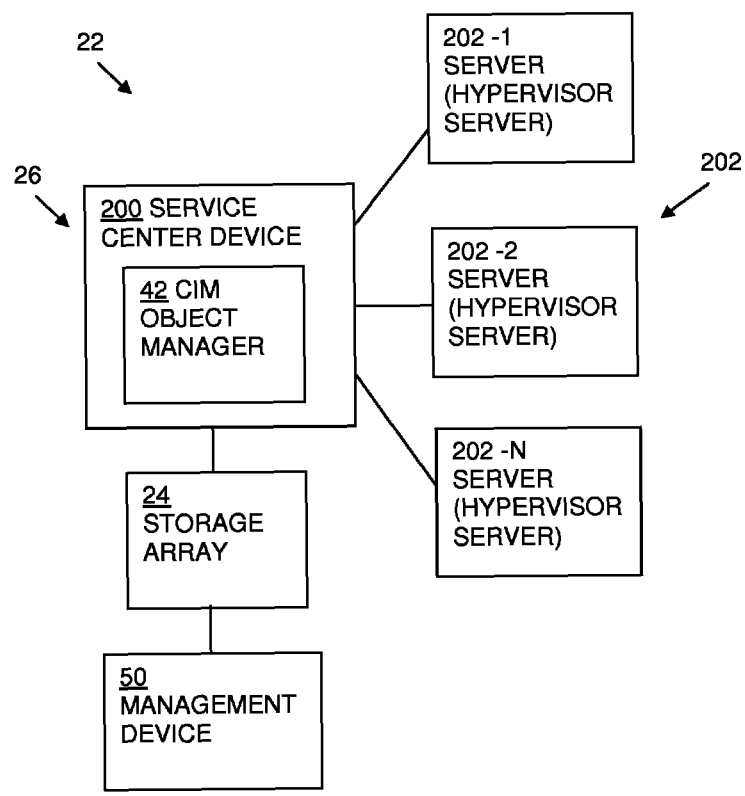
FIG. 3 illustrates a schematic representation of a data storage system disposed in electrical communication with a service center device, according to one embodiment.

In the case where multiple server devices, such as hypervisor servers, are utilized as part of the data storage system 22, as illustrated in FIG. 3, the data storage system 22 can include a central hub, such as a service center device 200, as the server device 26. As illustrated, the service center device 200 is disposed in electrical communication with a set of hypervisor servers 202 and is configured with a CIM object manager 42. In one arrangement, in response to a management request 70, the CIM object manager 42 is configured to execute monitoring calls requested from the storage array 24 to collect object class information, such as host LUN usage information, related to the storage attributes of all of the hypervisor servers 202, and associated device processes 40, such as VMs, electrically coupled to the service center device 200.

As described above, the CIM object manager administrator role 94 is configured to execute CIM object monitoring or polling calls on behalf of the storage array 24 on the server device 26 and relating to the status of the storage utilized by the server device 26. Such description is by way of example only. In one arrangement, the CIM object manager administrator role 94 can be configured an Accesscontrol role, an Audit role, a Compliance role, a Configuration role, or a Replication role. For example, the Configuration role allows a management device 50 via the storage array 24 to configure various aspects of the server device 26, such as identification and network configuration settings associated with the server device 26.

In another example, as shown in FIG. 1, the database 82 indicates that each user 75-1 through 75-3 belongs to a corresponding group. It should be noted that each user can belong to more than one group. For example, the second user Steve Jones can belong to both the Users group and the Administrators group.

As described above, the CIM object manager OS role is configured as a CIM object manager OS group role 94 operable to execute any CIM object calls associated for a user associated with a particular group. For example, a CIM object manager OS Administrator role 94-1 is configured to execute any CIM object calls associated with the Administrators group while a CIM object manager OS Users role 94-2 is configured to execute any CIM object calls associated with the Users group. Such description is by way of example only. In one arrangement, the CIM object manager OS role 94 is configured as a CIM object manager OS directory role operable to execute any CIM object calls for a user associated with a particular directory. For example, the role mapping module 92 can map a user to a CIM object manager OS directory role based upon the user being either a local or domain user. In turn, a CIM object manager OS Local directory role is configured to execute any CIM object calls associated with a local directory while a CIM object manager OS Domain directory role is configured to execute any CIM object calls associated with a domain directory.

What is claimed is:

1. In a server device, a method for providing host object class information to a management device, comprising:
mapping, by the server device, user names included as part of entries of a database associated with the server device to a corresponding Common Information Model (CIM) object manager operating system (OS) role;

receiving, by the server device, a management request associated with a storage array, the management request having management request credential information;

authenticating, by the server device, the management request to an operating system associated with the server device based upon the management request credential information;

following authentication, authorizing, by the server device, the management request to a corresponding CIM object manager OS role using the management request credential information; and executing, by the server device, a CIM object call associated with the management request using the associated CIM object manager OS role to access object class information in response to the management request;

wherein authorizing the management device to a corresponding CIM object manager OS role using the management request credential information comprises detecting a correspondence, by the server device, between a group identifier associated with the management request credential information and a CIM object manager OS role, the CIM object manager OS role configured as a CIM object manager OS group role; and executing the CIM object call associated with the management request using the associated CIM object manager OS role to access object class information in response to the management request comprises executing, by the server device, the CIM object call associated with the management request using the associated CIM object manager OS group role to access object class information in response to the management request.

2. The method of claim 1, wherein mapping user names included as part of entries of the database associated with the server device to the corresponding CIM object manager OS role comprises mapping, by the server device, user names associated with a group, as included as part of entries of a database associated with the server device to a corresponding CIM object manager OS group role.

3. The method of claim 1, wherein receiving the management request having management request credential information comprises receiving the management request having management request credential information that includes a user name and a password associated with a user of the server device.

4. The method of claim 2, wherein authenticating the management request to the operating system associated with the server device using the management request credential information comprises:

comparing, by the server device, the user name and the password of the management request credential information with entries of the database;

in response to detecting an absence of a match between the user name and the password of the management request credential information and the entries, refraining, by the server device, from authenticating the management device to interact with the operating system associated with the server device; and in response to detecting a match between the user name and the password of the management request device credential information and the entries, authenticating, by the server device, the management device to interact with the operating system associated with the server device.

5. The method of claim 1, wherein the CIM object call associated with the management request is configured as a monitoring call.

6. The method of claim 5, wherein executing the CIM object call associated with the management request using the associated CIM object manager OS group role to access object class information in response to the management request comprises:

providing, by the server device and via the associated storage array, the storage object class information to the management device in response to the management request.

7. The method of claim 1, wherein the server device is configured as a hypervisor device.

8. The method of claim 1, wherein the server device is configured as a service center device disposed in electrical communication with a set of hypervisor servers.

9. A server device, comprising:

a communications interface; and a controller disposed in electrical communication with the communications interface, the controller configured to:

map user names included as part of entries of a database associated with the server device to a corresponding Common Information Model (CIM) object manager operating system (OS) role;

receive a management request associated with a storage array, the management request having management request credential information;

authenticate the management request to an operating system associated with the server device based upon the management request credential information;

following authentication, authorize the management request to a corresponding CIM object manager OS role using the management request credential information; and execute a CIM object call associated with the management request using the associated CIM object manager OS role to access object class information in response to the management request;

wherein when authorizing the management device to a corresponding CIM object manager OS role using the management request credential information the controller is configured to detect a correspondence, by the server device, between a group identifier associated with the management request credential information and a CIM object manager OS role, the CIM object manager OS role configured as a CIM object manager OS group role; and when executing the CIM object call associated with the management request using the associated CIM object manager OS role to access object class information in response to the management request the controller is configured to execute the CIM object call associated with the management request using the associated CIM object manager OS group role to access object class information in response to the management request.

10. The server device of claim 9, wherein when mapping user names included as part of entries of the database associated with the server device to the corresponding CIM object manager OS role the controller is configured to map user names associated with a group, as included as part of entries of a database associated with the server device to a corresponding CIM object manager OS group role.

11. The server device of claim 9, wherein when receiving the management request having management request credential information the controller is configured to receive the management request having management request credential information that includes a user name and a password associated with a user of the server device.

12. The server device of claim 11, wherein when authenticating the management request to the operating system associated with the server device using the management request credential information, the controller is configured to:
- compare the user name and the password of the management request credential information with entries of the database;
- in response to detecting an absence of a match between the user name and the password of the management request credential information and the entries, refrain from authenticating the management device to interact with the operating system associated with the server device; and
- in response to detecting a match between the user name and the password of the management request credential information and the entries, authenticate the management device to interact with the operating system associated with the server device.

13. The server device of claim 9, wherein the CIM object call associated with the management request is configured as a monitoring call.

14. The server device of claim 13, wherein when executing the CIM object call associated with the management request using the associated CIM object manager OS group role to access object class information in response to the management request the controller is configured to:
- provide, via the associated storage array, the storage object class information to the management device in response to the management request.

15. The server device of claim 9, wherein the server device is configured as a hypervisor device.

16. The server device of claim 9, wherein the server device is configured as a service center device disposed in electrical communication with a set of hypervisor servers.

17. The method of claim 1, wherein the management request associated with a storage array includes requesting information related to a host usage of storage array objects including disk usage and LUN usage.

18. The method of claim 1, wherein the mapping of user names included as entries in the database includes a role mapping module configured to map user names identified as belonging to a selected group identifier to a corresponding Common Information Model (CIM) object manager operating system (OS) role, the selected group including at least one of an administrator role, a manager role, and a user role.

* * * * *